Oct. 31, 1961 D. A. JACK 3,006,702
BEARING ASSEMBLY
Filed May 2, 1960 3 Sheets-Sheet 1
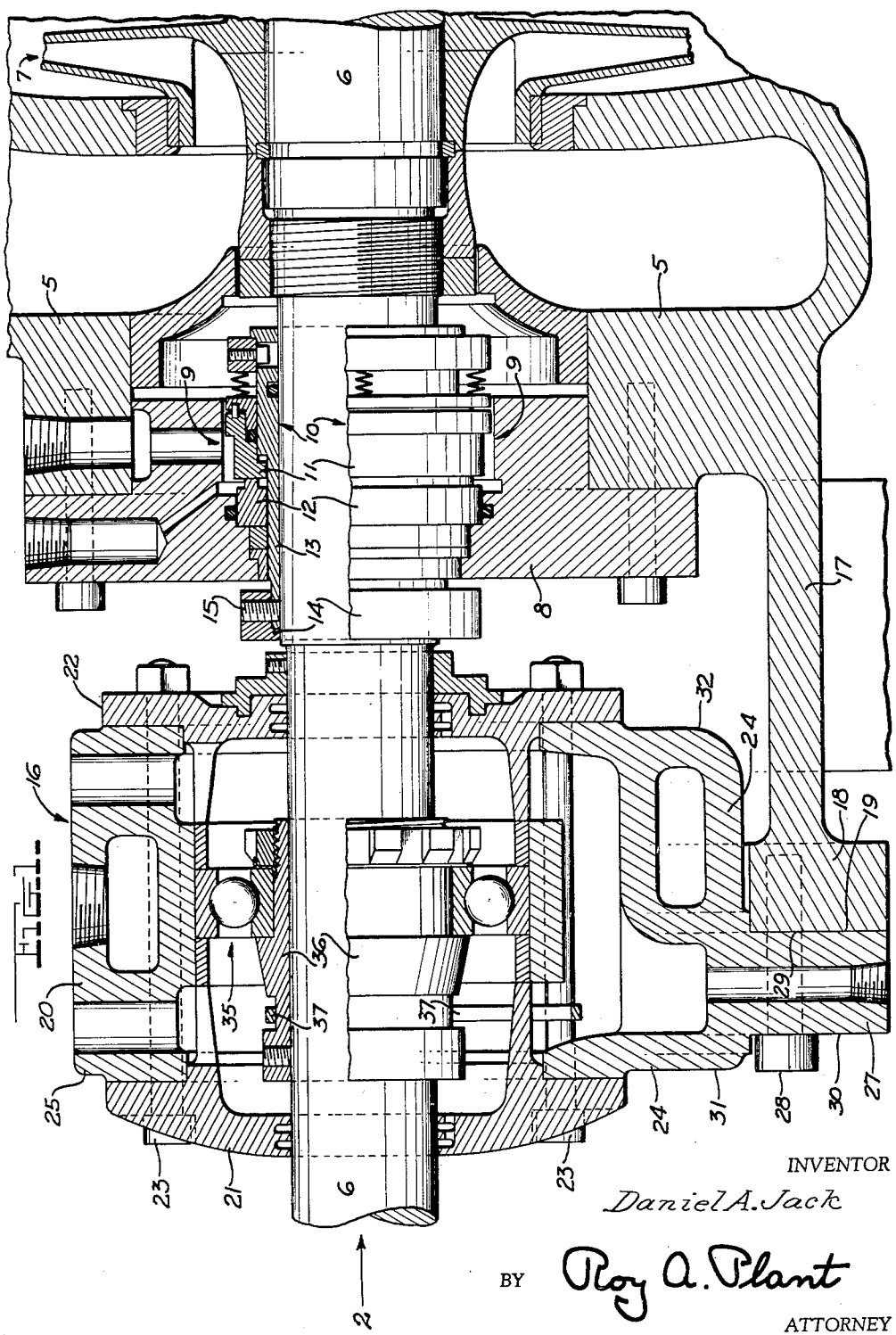
INVENTOR
Daniel A. Jack
BY Roy A. Plant
ATTORNEY

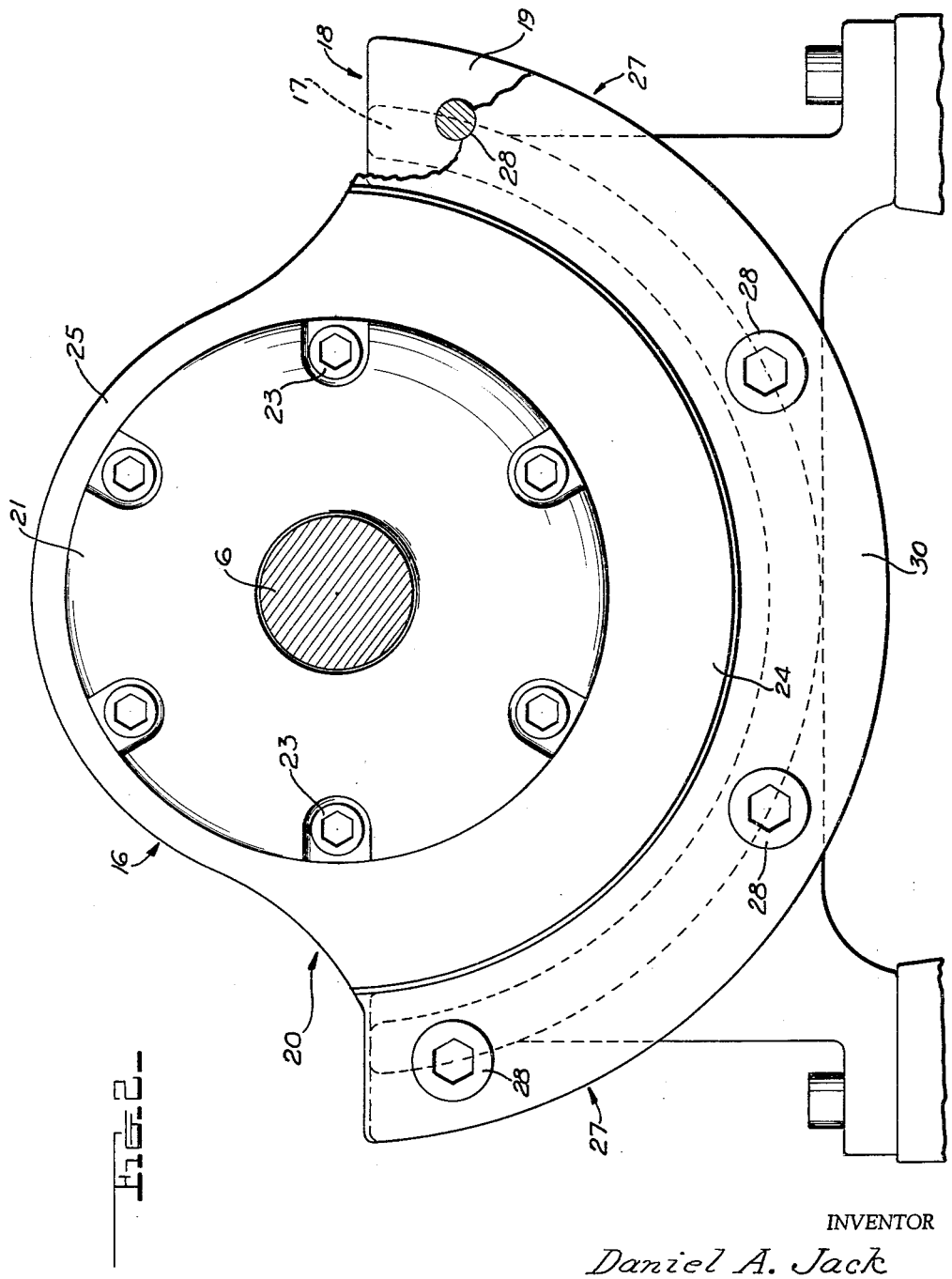

Oct. 31, 1961    D. A. JACK    3,006,702
BEARING ASSEMBLY
Filed May 2, 1960    3 Sheets-Sheet 3
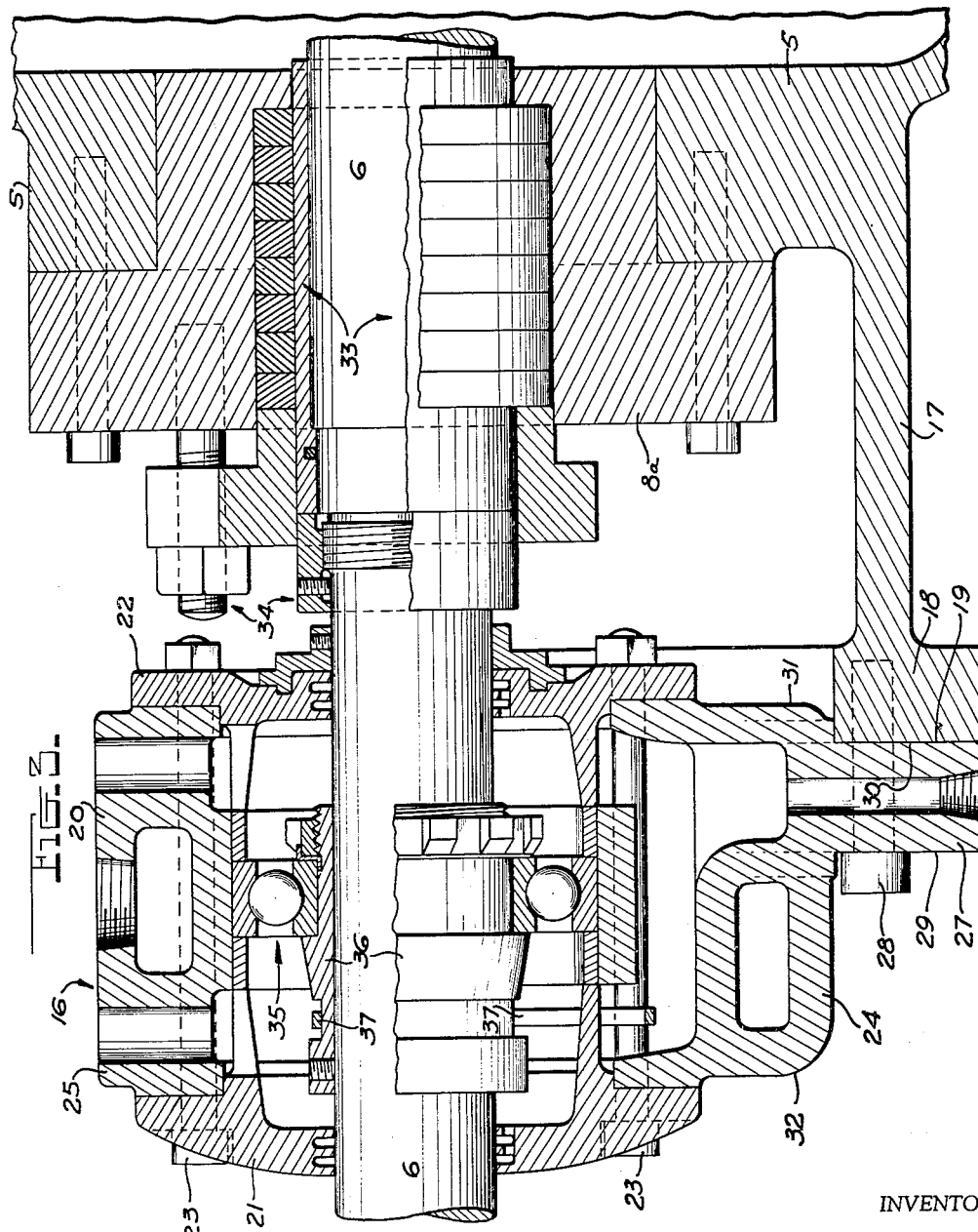
INVENTOR
Daniel A. Jack
BY Roy A. Plant
ATTORNEY United States Patent Office 3,006,702
Patented Oct. 31, 1961

3,006,702
BEARING ASSEMBLY
Daniel A. Jack, Battle Creek, Mich., assignor to Union Pump Company, Battle Creek, Mich., a corporation of Michigan
Filed May 2, 1960, Ser. No. 26,250
5 Claims. (Cl. 308—189)

The present invention relates broadly to bearing assemblies, and in its more specific phases to removable bearing assemblies adapted for mounting in more than one position on the ends of a centrifugal pump or the like.

Centrifugal pumps have a shaft extending through a casing or main housing, and which shaft carries one or more impellers. The ends of the shaft project beyond the ends of the housing through sealing means in each end of said housing, and are mounted in bearings which are secured to rigid supports projecting longitudinally from the housing and supported on same. To minimize bending of the shaft under conditions of use, the bearing supports at each end of the main housing are mounted as close as possible to the center of the main housing. The kind or type of seal used around the shaft in the ends of the main housing determines whether each bearing can be installed relatively close to the center of the main housing, or must be installed more distantly therefrom, since, for instance, a conventional long stuffing box type of seal has elements projecting much further from the center of the casing or housing than some of the more modern short so-called mechanical seals. Consequently, the mounting of the bearings close to the housing whenever permitted, but otherwise more distant from the housing when required has entailed complications, such as manufacturing two lengths of main pump housings for use with the two kinds of seals, or making of the bearing assemblies or supports of one position mounting for a short type of seal and other bearing assemblies of another position mounting for a longer type of seal, or even requiring machining off portions of the casing or main housing ends to decrease their length and permit bringing the bearing assembly or support closer to the center of the main housing when modern short mechanical seals are installed in a pump previously having, or constructed to use, the conventional long stuffing box type of seal. It was a recognition of this problem as well as the shortcomings of the prior art, and the complete lack of any simple and adequate, commercially satisfactory, solution to such problem which led to the conception and development of the present invention.

Accordingly among the objects of the present invention is the provision of means to overcome the prior difficulties by providing a novel shaft bearing assembly which may be installed in either of two relatively reversed positions; in one of said positions it will be in close relation with the end of the casing or main housing, and in the other of said positions, will be more distant from the center of said casing or main housing. Thus, the two shaft bearing assemblies may be installed in the preferred locations, as close as possible to the end of the main housing, and when close-in locations are impossible, the bearing assemblies may be installed in a further outward spaced position meeting the requirements.

A further object is to make possible changing the position of the bearing assembly at each end of the pump housing to meet the requirements for either long packed seals or short mechanical seals at each end of the pump main housing by reversing the bearing assembly without altering the length of the casing or main housing of the pump.

Still further objects and advantages of the present invention will appear as the description proceeds.

To the accomplishment of the foregoing and related ends, the invention, then, consists of the bearing means hereinafter fully described and particularly pointed out in the claims, the annexed drawings and the following description setting forth in detail certain means for carrying out the invention, such disclosed means illustrating, however, but one of various ways in which the principle of the invention may be used.

In the annexed drawings:

FIGURE 1 is a central vertical longitudinal section, partly in elevation, showing one end portion of a pump having a short mechanical seal and, closely adjacent thereto, one of the improved shaft bearing assemblies of the present invention.

FIGURE 2 is an end view as indicated by the arrow 2 at the left hand side of FIGURE 1.

FIGURE 3 is a view similar to FIGURE 1 but showing one of the improved bearing assemblies installed in a pump having the same casing or main housing but a conventional long stuffing box type of seal.

An end portion of a pump casing or main housing body 5 is shown in FIGURE 1. Here a driven shaft 6 extends longitudinally through the housing body 5 and carries one or more impellers, one of which is fragmentarily shown at 7. The ends of the housing body 5 are closed by end members, one of which is shown at 8, and as shown in FIGURE 1 each of these end members is recessed at 9 to receive a conventional mechanical seal unit 10. The principal sealing function of the seal 10 is performed by two contacting rings 11 (rotates with shaft) and 12 (stationary with housing) which surround a sleeve 13. This sleeve surrounds the shaft 6, projects a slight distance beyond the end member 8, and may be conventionally provided with a collar 14. The sleeve and collar are secured to the shaft 6 in conventional manner, such as by means of a set screw 15.

The shaft 6 projects beyond the end of the pump casing or main housing 5, and end member 8, and is mounted and carried in one of the improved bearing assemblies 16. This bearing assembly is mounted on a support 17 which projects longitudinally from, and may be a part of the body of main housing 5. Another of the improved bearing assemblies 16 carries and supports the other end of the shaft 6, and such bearing assembly is itself mounted on another support member corresponding to the support 17, and to save duplication same has not been illustrated.

The support 17 is customarily of longitudinally channeled form for strength and stability, FIGURE 2, and has a thickened outer end portion 18, FIGURE 1, the end surface 19 of which is in a plane preferably at a right angle to the axis of the shaft 6.

All of the elements so far described, except the bearing assembly 16 including bearing housing or body 20, are conventional and have therefore been described with minimum detail.

In the form of the bearing construction shown in all figures of the drawings, the bearing assembly 16 includes a body 20, and interchangeable end plates 21 and 22 secured by bolts 23, or the like, to the ends of said body 20. This body is preferably cylindrical and provided with an outwardly extending lower section 24, FIGURE 2, and a narrower upper section 25 which is a unitary extension of said lower section 24.

The lower section 24 has an integral, peripheral mounting flange 27 to be secured by screws 28 to the bearing support 17, and said flange 27, in the preferred form illustrated, has two sides 29 and 30 which are symmetrical with a plane at right angles to the axis of the bearing assembly 16, and with end surface 19 of outer end portion 18 operably fitting same. The flange side 30 is relatively close to one end 31 of the bearing body 20, and the flange side 29 is much more distant from the other end 32 of said body.

When the pump in which the bearing assembly 16 is to be installed has a short "mechanical seal," such as the unit 10 of FIGURE 1, which permits location of the bearing assembly close to the pump housing, the flange 27 is secured to the support 17, with the flange side 29 abutting the end surface 19 of said support, as seen in FIGURE 1. It is thus assured that the bearing be located close to the pump housing for reduced unsprung length of shaft 6.

Whenever the pump has a conventional long stuffing box 33, FIGURE 3, including elements 34 which so project from the pump casing or main housing 5 that the bearing assembly 16 cannot be located close to said housing, the bearing end plates 21 and 22 are interchanged on the bearing body 20 which is then mounted in a reversed position on the casing or main pump housing 5 with the flange side 30 abutting the end surface 19 of the support 17, thereby operably providing the desired close spacing of the bearing assembly from the pump housing without having to change the pump housing itself.

In the bearing construction shown, the two end plates 21 and 22 are so differently shaped that plate 21 would strike the stuffing box element 34, FIGURE 3, were interchange of said end plates not effected when the bearing assembly 16 is reversed. However, it will be understood that a construction could well be provided which would require no interchange, since end plate 21 is shown of rounded contour to provide an especially attractive appearance, and such showing is intended to diagrammatically illustrate the various equivalent shapes which the end plates can take.

In mounting the shaft 6 in the bearing assembly 16, a suitable ball bearing assembly 35 is employed. This assembly, which may be press fit into body 20 if desired, preferably includes a sleeve 36 mounted to rotate with shaft 6 and from which hangs an oil dip ring 37 for conventionally lubricating the bearing under conditions of use.

The construction shown for one end of the pump is substantially duplicated for the other end and therefore requires no illustration.

It will be seen from the foregoing that a novel and advantageous construction has been disclosed for attaining the desired ends. However, attention is invited to the possibility of making variations within the spirit and scope of the invention as shown and described.

Other modes of applying the principle of my invention may be employed instead of the one explained, change being made as regards the bearing means herein disclosed, provided the means stated by any of the following claims or the equivalent of such stated means be employed.

I therefore particularly point out and distinctly claim as my invention:

1. Means for two-position reversible supporting of a bearing for mounting a shaft end which projects outwardly from a machine casing, said means for two-position reversible supporting of a bearing includes a bearing body and mounting means for said bearing body, said mounting means being in the form of a flange extending sidewise from said bearing body, and being nearer one end of said body than the other, the opposite sides of said flange being symmetrical with a plane perpendicular to the longitudinal axis of said bearing, said support means also including a member extending outward from the end of said machine casing and having an end face at an angle to a plane perpendicular to said shaft which will match and fit against the side of the sidewise extending flange of said bearing body, said outward extending member also having an inner face of a size such that said bearing body will fit therein with either side of the flange of the latter fitting up against the end face of said flange on the end of said outward extending member of said machine casing, and means for releasably joining said flanges together, whereby reversing the bearing body on the outer end of said member extending outward from said machine casing will vary the spacing of said bearing from the end of said machine casing.

2. A structure as specified in claim 1, in which said bearing is mounted substantially mid-length of said bearing body so that reversal of said bearing body on the end of said outward extending member of said machine casing will correspondingly change the position of said bearing relative to the end of said machine casing, and means at opposite ends of said bearing body for closing same and positioning said bearing in said bearing body.

3. A structure as specified in claim 1 in which the opposite ends of said bearing body are closed by interchangeable end plates having openings therethrough closely fitting said shaft rotatably supported in said bearing mounted in said bearing body.

4. A machine having a casing and a rotatable shaft extending through both ends of same with a reversible bearing assembly for supporting the extending ends of said rotary shaft, wherein said bearing assembly has a bearing and a body member within which said bearing fits, said body member having a radially projecting mounting flange, said flange having opposite faces which are symmetrical with a plane perpendicular to the longitudinal axis of said bearing and with said flange being offset endwise relative to said bearing and nearer to one end of said body member than the other, said machine casing having an extending member at each end of same with the outer face of each of these extending end members being at an angle to a plane perpendicular to said rotary shaft which will fit against the side of said sidewise extending flange of said bearing body member, said extending end members at the outer end of same having an inner radius a little larger than the outer radius of said body member so that the latter may be reversed for varying the spacing of said bearing from the corresponding end of said machine casing.

5. In a structure as specified in claim 4, wherein the extending end members of said machine casing are each in the form of an upwardly opening channel below the corresponding extending portion of said shaft, with the outer end of each of said extending end members being in the form of a flange, and means for joining either side of the flange of said bearing body member to the outer face of the flange of either of said extending end members of the machine casing.

References Cited in the file of this patent

UNITED STATES PATENTS

| | | |
|---|---|---|
| 1,803,625 | Larson | May 5, 1931 |
| 2,037,982 | Hughes | Apr. 21, 1936 |